United States Patent [19]
Hayashi et al.

[11] 4,122,517
[45] Oct. 24, 1978

[54] THYRISTOR CONTROL METHOD FOR THYRISTOR AC-DC CONVERTER

[75] Inventors: Shigeki Hayashi, Tokyo; Takemitsu Okamoto, Yokohama, both of Japan

[73] Assignee: Nusco Kabushiki Kaisha, Tokyo, Japan

[21] Appl. No.: 852,008

[22] Filed: Nov. 16, 1977

[30] Foreign Application Priority Data

Nov. 22, 1976 [JP] Japan .................. 51-140987

[51] Int. Cl.² ........................... H02M 7/155
[52] U.S. Cl. ....................... 363/85; 363/129; 318/227; 318/345 G
[58] Field of Search ............... 318/227, 345 R, 345 C, 318/345 G, 416; 363/85, 128, 129

[56] References Cited
U.S. PATENT DOCUMENTS 3,571,689   3/1971   Wise ..................... 318/345 X Primary Examiner—William M. Shoop
Attorney, Agent, or Firm—Pollock, Vande Sande and Priddy

[57] ABSTRACT

In an AC-DC converter for converting an AC power by a six-phase, half-wave or three-phase, full-wave back-to-back or anti-parallel connection thyristor bridge to a DC power for input to a load, while the current to the load is small, the converter is actuated as a converter of a three-phase, half-wave back-to-back connection bridge, thereby to enable an alternate supply of negative and positive currents to the load. Letting the output by the AC-DC converting operation of the three-phase, half-wave back-to-back connection bridge and the output by the other converting operation be identified as main and auxiliary outputs, respectively, as the load current increases, the auxiliary output is also supplied to the load.

6 Claims, 15 Drawing Figures

THYRISTOR CONTROL METHOD FOR THYRISTOR AC-DC CONVERTER

BACKGROUND OF THE INVENTION

This invention relates to a thyristor control methode in a thyristor AC-DC converter for converting an AC power into a DC power by a six-phase, half-wave or three-phase, full-wave back-to-back or anti-parallel connection thyristor bridge.

For instance, a DC servo type control device requires, for its starting, a supply of a large current to its DC motor because of mechanical inertia but, in many cases, it is necessary to supply a positive or negative small current to the DC motor after a rapid acceleration or deceleration. Where a thyristor AC-DC converter is employed in such a DC servo type control device, a three-phase, half-wave back-to-back connection bridge is adopted recently but a supply of a large current of large ripples inflicts serious damage on the motor commutator. For supplying a current of as small ripples as possible, it is desirable to use an AC-DC converter of the type employing a six-phase, half-wave or three-phase, full-wave back-to-back connection thyristor bridge. In the DC servo type control device, it is impossible to supply the DC motor with a current corresponding to a small error signal because of the dead zone of the AC-DC converter employing the thyristor bridge. Accordingly, it is the practice in the art to supply the DC motor with positive and negative currents alternately with each other to achieve a control corresponding to the difference between the positive and negative currents. Such a control is possible with the three-phase, half-wave back-to-back connection bridge in the prior art. In the case of the six-phase, half-wave or three-phase, full-wave back-to-back connection, however, when applying positive and negative currents in an attempt to supply them to the DC motor, a current flows to short-circuit the secondary winding of a transformer due to the thyristor and no current flows in the DC motor, so that it is impossible to achieve such a control by alternate application of the positive and negative currents to the DC motor.

One object of this invention is to provide a thyristor control methode for a back-to-back or anti-parallel connection thyristor bridge AC-DC converter with which it is possible to supply a load with a large current of small ripples and to alternately apply positive and negative currents to the load with a small control signal.

Another object of this invention is to provide a thyristor control methode for a back-to-back connection thyristor bridge AC-DC converter which neither impairs the commutator of a DC motor, i.e. a load, nor necessitates the use of a special and expensive commutator nor provides any dead zone and enables an accurate control of the DC motor.

SUMMARY OF THE INVENTION

According to this invention, in an AC-DC converter using a six-phase, half-wave or three-phase full-wave back-to-back or anti-parallel connection thyristor bridge, a small load current is derived from the output from the three-phase half-wave back-to-back connection bridge and the gates of thyristors are controlled so that when the three-phase, half-wave output is used as a main output and the other three-phase, half-wave output as an auxiliary output, the thyristors for providing the auxiliary output do not conduct and that as the load current increases, the auxiliary output is produced. That is, the thyristor gates are controlled in such a manner that the thyristor bridge serves as a complete three-phase, half-wave back-to-back connection bridge, or an incomplete six-phase, half-wave or three-phase, full-wave back-to-back connection bridge, or substantially a balanced six-phase, half-wave or three-phase, full-wave back-to-back connection bridge depending upon whether a small, medium or large current is supplied to the DC motor.

DESCRIPTION OF THE PREFERRED EMBODIMENTS

Figure 1A:
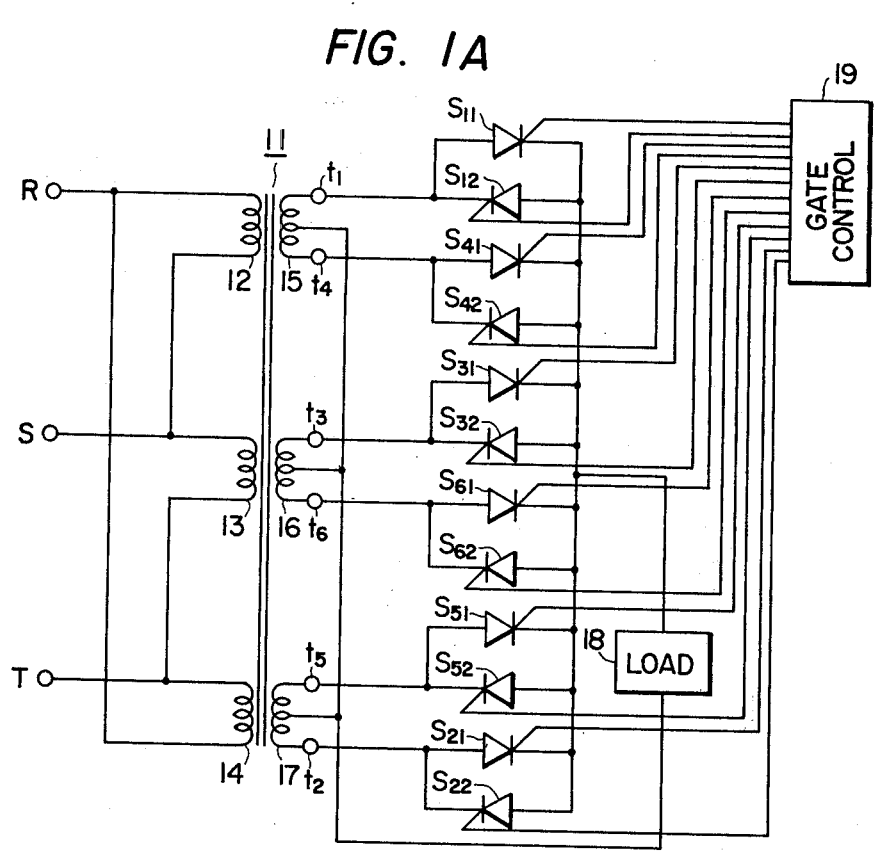
FIG. 1A is a circuit diagram illustrating an AC-DC converter employing a six-phase, full-wave back-to-back or anti-parallel connection thyristor bridge.

In FIG. 1, there is illustrated an AC-DC converter employing a six-phase, half-wave back-to-back or anti-parallel connection thyristor bridge and a three-phase input from input terminals R, S and T is supplied to primary windings 12, 13 and 14 of a three-phase transformer 11. Terminals $t_1$ and $t_4$ of both ends of a secondary winding 15 for the primary winding 12 are each connected to one end of each of thyristors $S_{11}$, $S_{12}$ and $S_{41}$, $S_{42}$. Similarly, terminals $t_3$, $t_6$ and $t_5$, $t_2$ of both ends of secondary windings 16 and 17 for the primary windings 13 and 14, respectively, are each connected to one end of each of thyristors $S_{31}$, $S_{32}$ and $S_{61}$, $S_{62}$ and thyristors $S_{51}$, $S_{52}$ and $S_{21}$, $S_{22}$. The two thyristors connected to each terminal are opposite in polarity to each other. The other ends of the thyristors $S_{11}$ to $S_{62}$ are connected together to one end of a load 18, the other end of which is connected to the neutral points of the secondary windings 15, 16 and 17. In a DC servo type control device, the load 18 of the thyristor bridge is the armature of a DC motor. As mentioned above, each end of the secondary windings 15, 16 and 17 has connected thereto a pair of thyristors in parallel but opposite in polarity to each other and the gates of the thyristors $S_{11}$ to $S_{62}$ are connected to a gate phase shift control 19.

Figure 2A:
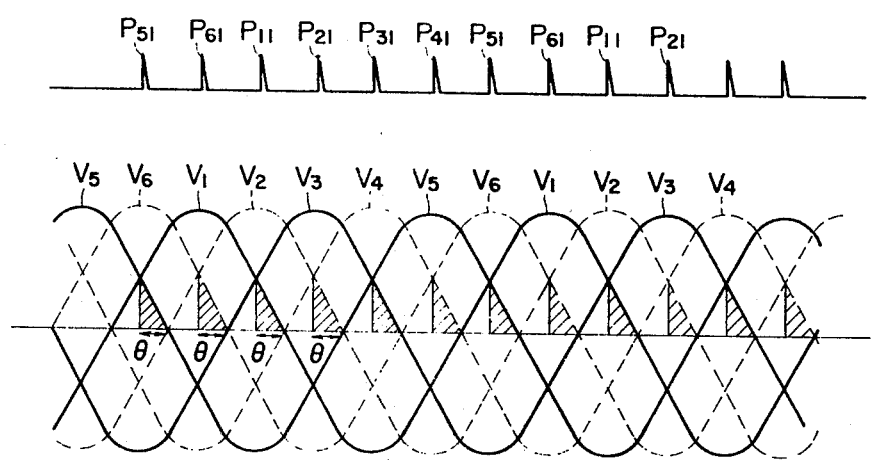
FIG. 2A is a graph explanatory of the operation of the AC-DC converter depicted in FIG. 1A.

At the output terminals $t_1$ to $t_6$ of the transformer 11 there appear six-phase AC currents $V_1$ to $V_6$, respectively, as shown in FIG. 2A. When to supply, for example, a positive current, to the load 18, gate pulses $P_1$, $P_2$, $P_3$, $P_4$, $P_5$ and $P_6$ are respectively applied to the thyristors $S_{11}$, $S_{21}$, $S_{31}$, $S_{41}$, $S_{51}$ and $S_{61}$, as shown in FIG. 2A, to conduct them. These thyristors are each capable of controlling the magnitude of the output current by changing the so-called current flow angle $\theta$, that is, the phase of a trigger pulse with respect to the corresponding AC voltage. For applying a negative current to the load 18, a current of a suitable magnitude can be supplied to each of the thyristors $S_{12}$ to $S_{62}$ similarly by changing the current flow angle.

Figure 1B:
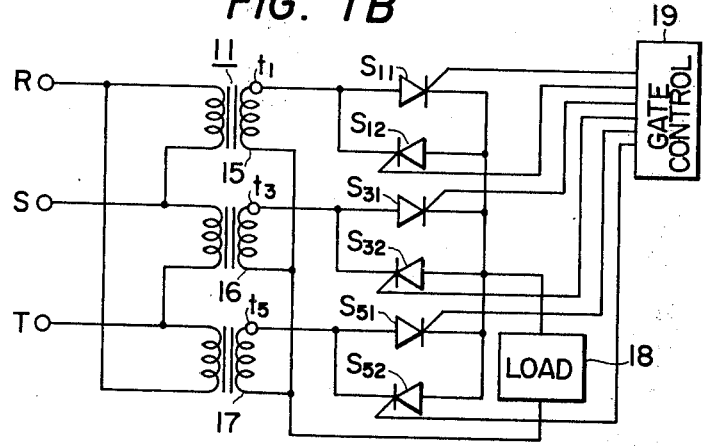
FIG. 1B is a circuit diagram showing an AC-DC converter using a three-phase, full-wave back-to-back connection thyristor bridge.
Figure 2B:
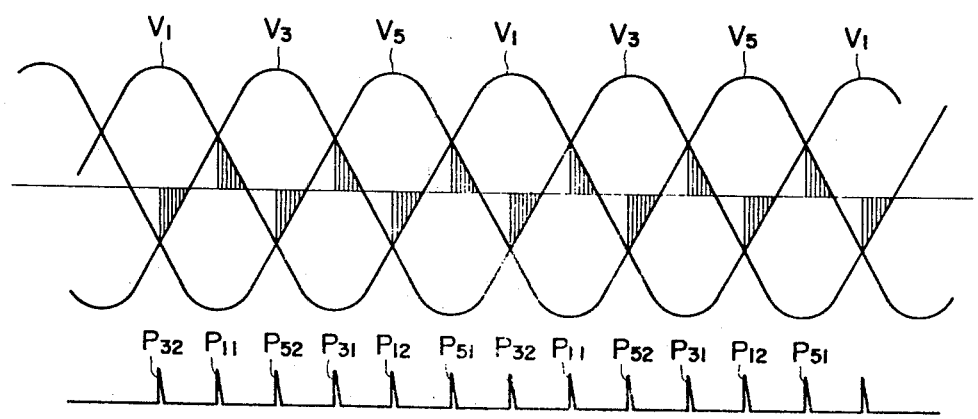
FIG. 2B is a graph explanatory of the operation of the AC-DC converter depicted in FIG. 1B.

In the DC servo type control device, it is required to avoid such a dead zone that no current flows to the DC motor when the absolute value of an input error signal to the gate phase shift control 19 is small. Further, it is desired that positive and negative currents are supplied to the DC motor alternately with each other to apply a positive or negative torque to a machine coupled with the DC motor to make it dynamic or vibrate it at all times. To meet such requirements, use has recently been made of a three-phase, half-wave back-to-back connection depicted in FIG. 1B. That is, the three-phase input from the input terminals R, S and T is applied to the three-phase transformer 11 and pairs of opposite-polarity thyristors $S_{11}$ and $S_{12}$, $S_{31}$ and $S_{32}$, and $S_{51}$ and $S_{52}$ are connected at one end to the corresponding one of the terminals $t_1$, $t_3$ and $t_5$ of the secondary windings 15, 16 and 17 of the transformer 11, and connected at the other end to one end of the load 18, which is, turn, connected at the other end to the other ends of the secondary windings 15, 16 and 17. The gates of the thyristors $S_{11}$ to $S_{52}$ are connected to the gate phase shift control 19. When the error signal is close to zero, the gate phase shift control 19 applies a pulse $P_{11}$ to the thyristor $S_{11}$ to conduct it for the AC voltage $V_1$ to supply a positive current to the load 18 and then applies a pulse $P_{52}$ to the thyristor $S_{52}$ to conduct it for the AC voltage $V_5$ to flow a negative current to the load 18, as shown in FIG. 2B. Thereafter, by conducting the thyristors $S_{31}$, $S_{12}$, $S_{51}$, $S_{32}$ and $S_{11}$ one after another, positive and negative currents are alternately fed to the load, that is, the DC motor 18. As the error signal becomes larger than zero in the positive or negative direction with such an operation, the current flow angles $\theta$ of the thyristors $S_{11}$, $S_{31}$ and $S_{51}$ for applying the positive current to the motor 18 or the thyristors $S_{52}$, $S_{12}$ and $S_{32}$ for applying the negative current to the motor 18 increase, so that no dead zone exists in the flow of the mean DC current to the DC motor even when the error signal is close to zero. Thus, there is obtained such an error signal input to output current characteristic as shown in FIG. 3A. Namely, when the error signal is zero, the positive and negative currents flowing to the DC motor 18 are equal in magnitude to each other.

In the case of the six-phase, half-wave back-to-back connection, however, it is impossible to apply a positive-negative alternating current to the motor because of the circuit construction, as is the case with the three-phase, full-wave back-to-back connection. Since the six forward thyristors all conduct in response to the voltages $V_1$ to $V_6$, when attempting to conduct the six backward thyristors in reply to the voltages $V_1$ to $V_6$, no current flows to the motor but instead the so-called cross current short-circuits each secondary winding of the transformer 11 through the thyristor. This gives rise to the necessity of limiting the cross current to result in the increased manufacturing cost. Apart from the high manufacturing cost, the purpose of applying the alternating current to the motor cannot be attained.

In the case of the three-phase, half-wave connection, the alternating current can be applied to the motor but when the error signal increases and a large current flows, since it is a three-phase, large ripple current, a problem arises as to commutator or an unnecessarily large motor is required.

In the present invention, a small load current is obtained with a three-phase, back-to-back connection bridge, as mentioned previously. In FIG. 1A, the output from a three-phase, half-wave back-to-back connection bridge composed of the thyristors, for example, $S_{11}$, $S_{12}$, $S_{31}$, $S_{32}$, $S_{51}$ and $S_{52}$, is used as a main output and this bridge will hereinafter be referred to as the main output bridge, while the output from a three-phase, half-wave back-to-back connection bridge composed of the other thyristors $S_{21}$, $S_{22}$, $S_{41}$, $S_{42}$, $S_{61}$ and $S_{62}$ is used as an auxiliary output and this bridge will hereinafter be referred to as the auxiliary output bridge. When the current supplied to the load 18 is increased, the thyristors $S_{21}$, $S_{22}$, $S_{41}$, $S_{42}$, $S_{61}$ and $S_{62}$ are also controlled to conduct, by which the output from the auxiliary output bridge is also supplied to the load 18. In other words, the output from a six-phase, back-to-back connection bridge as a whole is fed to the load 18. In this manner, the output from the AC-DC converter is divided into a main output and an auxiliary output and when the current to the load is small, the main output is used, that is, the converter is actuated as an AC-DC converter composed of the three-phase, half-wave back-to-back connection bridge. Accordingly, positive and negative currents can be applied to the load 18 alternately with each other, as described above.

Figure 3B:
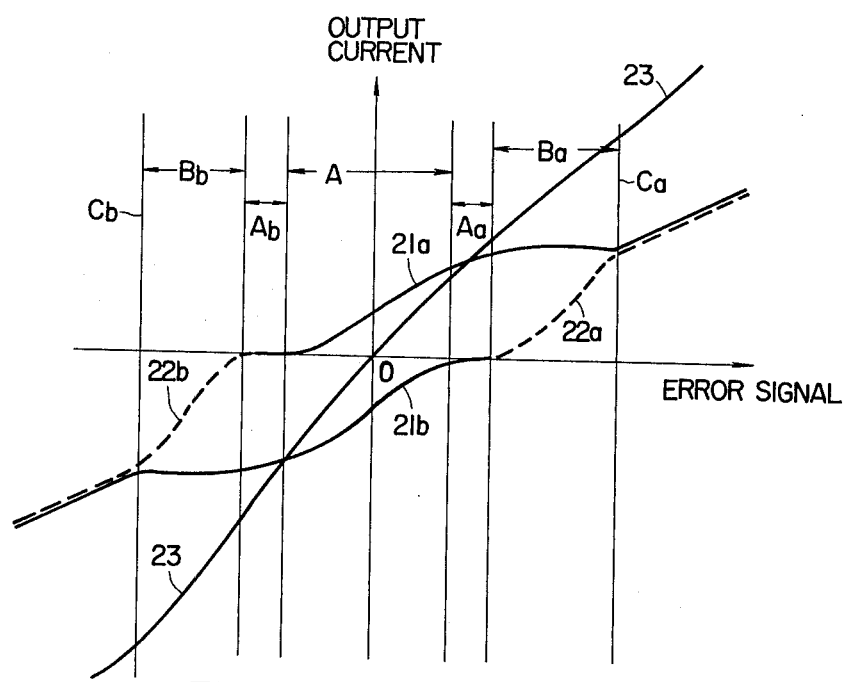
FIG. 3B is a graph showing an example of the output current-deviation signal input characteristics obtained with an embodiment of the control system of this invention.
Figure 3A:
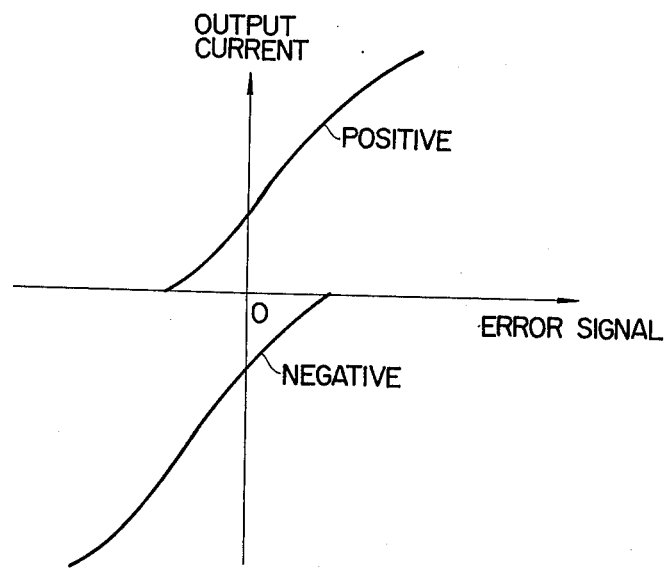
FIG. 3A is a graph showing an example of the output current-deviation signal input characteristics of the three-phase, half-wave back-to-back connection bridge.

FIG. 3B illustrates an example of the relationship of the thyristor bridge output current to the error signal input in the present invention designed so that positive and negative currents are applied to the load 18 in the abovesaid manner. In FIG. 3B, the ordinate represents the thyristor output current and the abscissa the input error signal to the gate phase shift control 19. Above the abscissa, the load 18 is supplied with a positive current, which is derived from the conducting currents of the thyristors $S_{11}$, $S_{21}$, $S_{31}$, $S_{41}$, $S_{51}$ and $S_{61}$. Below the abscissa, the load 18 is supplied with a negative current, which is derived from the conducting currents of the thyristors $S_{12}$, $S_{22}$, $S_{32}$, $S_{42}$, $S_{52}$ and $S_{62}$. The thin solid lines 21a and 21b indicate the characteristics of the main output bridge, the broken lines 22a and 22b the characteristics of the auxiliary output bridge, and the thick solid line the overall characteristic. As shown in FIG. 3B, in the region A in which the mean load current is small, the current to the load is only the main output and, by the control described above with respect to FIG. 2B, the positive and negative currents are applied to the load 18 alternatively with each other and, further, the operation point is set in the gate phase shift control 19 such that when the error signal is zero, the current flow angles of the thyristors $S_{11}$, $S_{31}$ and $S_{51}$ for supplying the positive current and the current flow angles of the thyristors $S_{12}$, $S_{32}$ and $S_{52}$ for supplying the negative current may be substantially equal to each other. As the error signal increases, in the positive direction, the flow angles of the thyristors $S_{11}$, $S_{31}$ and $S_{51}$ for supplying the positive current increase but the flow angles of the thyristors $S_{12}$, $S_{32}$ and $S_{52}$ for supplying the negative current are decreased correspondingly. Conversely, as the error signal increases in the negative direction, the flow angles of the thyristors for the positive current are decreased and the current flow angles of the thyristors for the negative current are increased.

When the error signal increases in the positive or negative direction in excess of the region A in which the positive and negative currents flows to the load 18, only the positive or negative, three-phase, half-wave main output is supplied in the region A$a$ or A$b$ shown in FIG. 3B. When the error signal further increases, the auxiliary output indicated by the broken line 22$a$ or 22$b$ is also supplied to the load. In other words, the thyristors $S_{21}$, $S_{41}$ and $S_{61}$ or $S_{22}$, $S_{42}$ and $S_{62}$ are also controlled to apply an unbalanced six-phase, half-wave current to the load in the regions B$a$ or B$a$ in FIG. 3B. Outside of these regions, that is, in the regions C$a$ and C$b$ in which a larger positive or negative current is applied to the load, the main and auxiliary outputs are made to have the same magnitude, supplying the load with substantially a balanced, six-phase, half-wave current.

Figure 4:
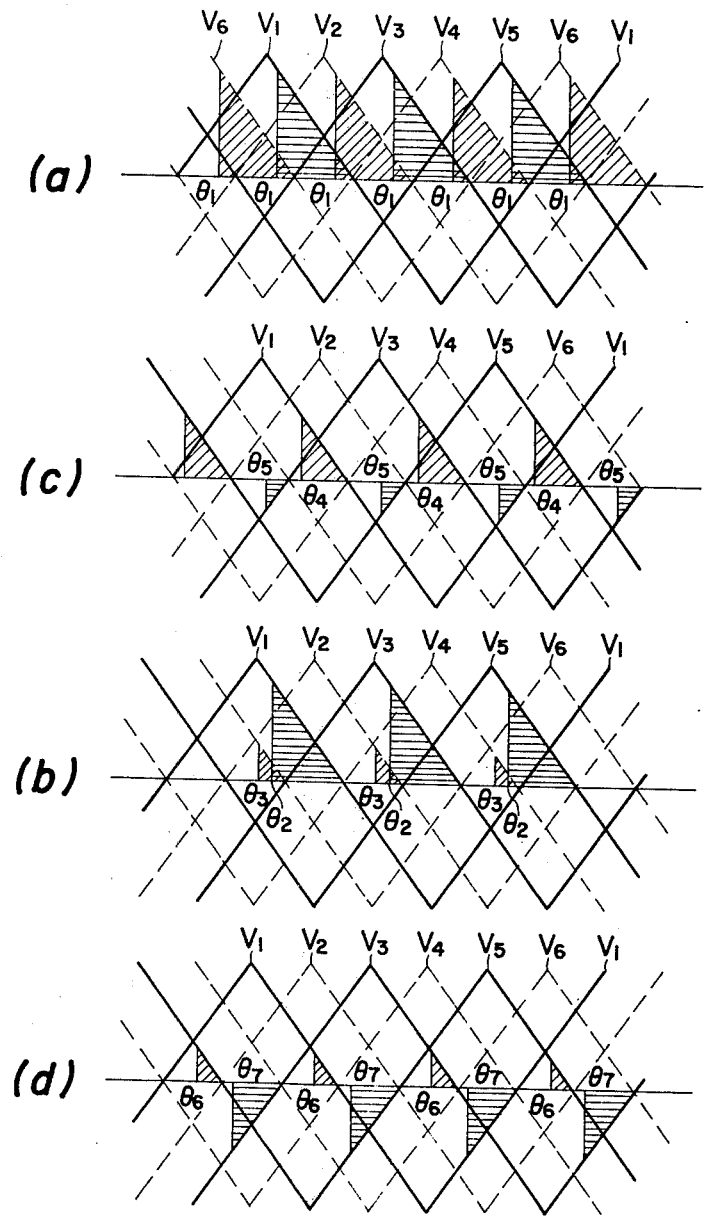
FIG. 4 is explanatory of the operation of the control system of this invention.

In FIG. 4, there is shown an example of the thyristors control state in the case wherein the thyristor AC-DC converter of such a control system is employed as a drive power source of a servo type control device. In FIG. 4, triangular-wave voltages are shown instead of sine-wave voltages. Where the error signal is large and a large current is supplied to a load or a servo motor, as depicted in FIG. 4($a$), the thyristors $S_{11}$, $S_{31}$ and $S_{51}$ supplied with the voltages $V_1$, $V_3$ and $V_5$, respectively, are each controlled to have the flow angle $\theta_1$ to supply a positive main output to the servo motor and, at the same time, the thyristors $S_{21}$, $S_{41}$ and $S_{61}$ supplied with the voltages $V_2$, $V_4$ and $V_6$, respectively, are also controlled to the current flow angle $\theta_1$ to supply the positive auxiliary output to the motor. Thus, a balanced six-phase, half-wave output is applied to the motor as a whole.

When the error signal decreases to enter the region B$a$ in FIG. 3B, the current flow angles $\theta_3$ of the voltages $V_2$, $V_4$ and $V_6$ for the auxiliary output becomes smaller than the current flow angles $\theta_2$ of the voltages $V_1$, $V_3$ and $V_5$ for the main output, as shown in FIG. 4($b$), providing the state of an unbalanced six-phase, half-wave output. In the state in which the error signal is extremely small and the motor current is in the region A in FIG. 3 and a positive current is supplied to the motor, no thyristors conduct for the voltages $V_2$, $V_4$ and $V_6$, that is, no auxiliary output is produced and the current flow angles $\theta_5$ of the thyristors $S_{12}$, $S_{32}$ and $S_{52}$ are made smaller than the current flow angles $\theta_4$ of the thyristors $S_{11}$, $S_{31}$ and $S_{51}$, as shown in FIG. 4($c$), and the mean difference between the currents of the two groups of thyristors flows in the motor. In the case of supplying a small negative current to the motor, the current flow angles $\theta_7$ of the thyristors $S_{12}$, $S_{32}$ and $S_{52}$ are made larger than the current flow angles $\theta_6$ of the thyristors $S_{11}$, $S_{31}$ and $S_{51}$, as depicted in FIG. 4($d$).

In FIGS. 4($c$) and 4($d$), since the bridge serves as a three-phase, back-to-back connection bridge, each of the pairs of thyristors $S_{21}$ and $S_{22}$, $S_{41}$ and $S_{42}$, and $S_{61}$ and $S_{62}$ connected to one end of each secondary winding of the transformer in FIG. 1 is always non-conducting and the both ends of the secondary windings are not short-circuited, ensuring the supply of the positive and negative currents to the load 18.

Figure 5:
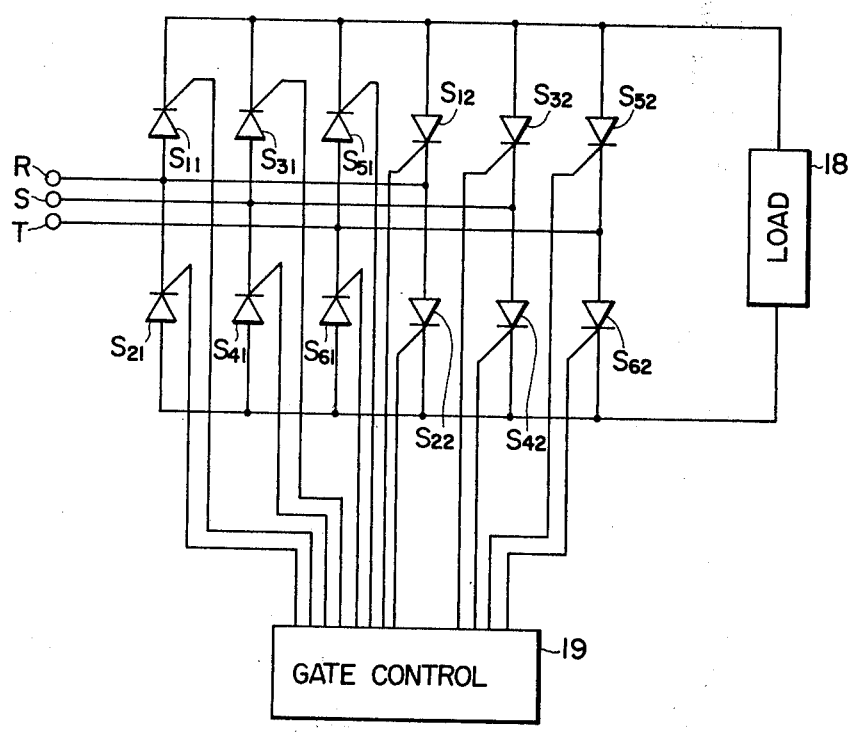
FIG. 5 is a circuit diagram illustrating an AC-DC converter employing a three-phase, full-wave back-to-back connection thyristor bridge.

Although this invention has been described above as being applied to the AC-DC converter employing the six-phase, half-wave back-to-back connection thyristor bridge, the invention is also applicable to an AC-DC converter employing a three-phase, full-wave back-to-back or anti-parallel connection thyristor bridge. FIG. 5 illustrates the AC-DC converter using the three-phase, full-wave back-to-back connection thyristor bridge. The terminal R is connected to the anodes of the thyristors $S_{11}$ and $S_{22}$ and the cathodes of the thyristors $S_{12}$ and $S_{21}$. The terminal S is connected to the anodes of the thyristors $S_{31}$ and $S_{42}$ and the cathodes of the thyristors $S_{32}$ and $S_{41}$. The terminal T is connected to the anodes of the thyristors $S_{51}$ and $S_{62}$ and the cathodes of the thyristors $S_{52}$ and $S_{61}$. The other ends of the thyristors $S_{11}$, $S_{31}$, $S_{51}$, $S_{12}$, $S_{32}$ and $S_{52}$ are connected to one end of the load 18 and the other ends of the thyristors $S_{21}$, $S_{41}$, $S_{61}$, $S_{22}$, $S_{42}$ and $S_{62}$ are connected to the other end of the load 18.

Figure 6:
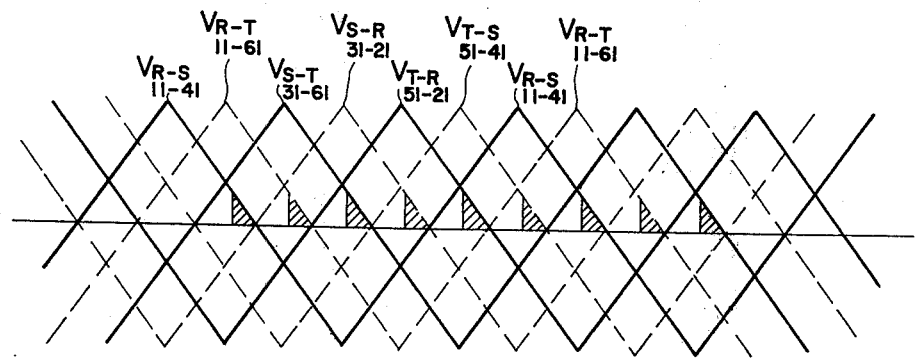
FIG. 6 is a graph explanatory of the operation of the AC-DC converter shown in FIG. 5.

A voltage $V_{RS}$ across the terminals R and S, a voltage $V_{ST}$ across the terminals S and T and a voltage $V_{TR}$ across the terminals T and R form a three-phase voltage, as depicted in FIG. 6. Voltages opposite in phase to these voltages $V_{RS}$, $V_{ST}$ and $V_{TR}$ are identified as $V_{SR}$, $V_{TS}$ and $V_{RT}$, respectively. In the case of supplying a positive current to the load 18, the thyristors $S_{11}$ and $S_{41}$ are conducted only at the hatched parts while the voltage $V_{RS}$ is positive, respectively, the thyristors $S_{31}$, $S_{61}$, $S_{51}$ and $S_{21}$ are conducted only at the hatched parts while the voltages $V_{ST}$ and $V_{TR}$ are positive, respectively, and the thyristors $S_{31}$, $S_{21}$, $S_{41}$, $S_{11}$ and $S_{61}$ are conducted only at the hatched parts while the voltages $V_{SR}$, $V_{TS}$ and $V_{RT}$ are positive, respectively. By controlling the current flow angles of the thyristors, the magnitude of the positive current to the load 18 can be controlled. In the case of applying a negative current to the load 18, the thyristors $S_{42}$, $S_{12}$, $S_{62}$, $S_{32}$, $S_{22}$, $S_{52}$, $S_{22}$, $S_{32}$, $S_{42}$, $S_{52}$, $S_{62}$ and $S_{12}$ are respectively conducted with suitable angles while the voltages $V_{RS}$, $V_{ST}$, $V_{TR}$, $V_{SR}$, $V_{TS}$ and $V_{RT}$ are negative, respectively.

In such a three-phase, full-wave back-to-back connection AC-DC converter, in the case of supplying a positive current to the load 18, the thyristors $S_{11}$, $S_{41}$, $S_{31}$, $S_{61}$, $S_{51}$ and $S_{21}$ are controlled when the voltages $V_{RS}$, $V_{ST}$ and $V_{RT}$ are respectively positive. In the case of supplying a negative current to the load, the thyristors $S_{42}$, $S_{12}$, $S_{62}$, $S_{32}$, $S_{22}$ and $S_{52}$ are controlled when the voltages $V_{RS}$, $V_{ST}$ and $V_{TR}$ are respectively negative. In other words, the AC-DC converter is actuated as a three-phase, half-wave back-to-back connection bridge to derive therefrom the main output and the voltages $V_{RT}$, $V_{SR}$ and $V_{TR}$ indicated by broken lines are not used. Als in this case, positive and negative currents by the main output are alternatively supplied to the load 18 and no dead zone is produced in the output current in reply to the error signal, as is the case with the six-phase, half-wave bridge. In the case of the three-phase, full-wave bridge, unlike in the case of the six-phase, half-wave one in which different thyristors are used for providing the main output and the auxiliary output, respectively, the thyristors are actuated in common to the main output and the auxiliary output but different combinations of the thyristors which conduct simultaneously are employed for producing the main output and the auxiliary output, respectively.

When to supply the positive current, if the thyristors $S_{11}$, $S_{41}$, $S_{31}$, $S_{61}$, $S_{51}$ and $S_{21}$ are used for obtaining the main output, the thyristors for the auxiliary output are $S_{11}$, $S_{61}$, $S_{31}$, $S_{21}$, $S_{51}$ and $S_{41}$. Similarly, in the case of the negative current supply, if the thyristors for the main output are $S_{42}$, $S_{12}$, $S_{62}$, $S_{32}$, $S_{22}$ and $S_{52}$, the thyristors for the auxiliary output are $S_{42}$, $S_{52}$, $S_{62}$, $S_{12}$, $S_{22}$ and $S_{32}$. Accordingly, in the case of the three-phase, full-wave bridge, if the gate shift phase control 19 is provided with a pulse generator for conducting the thyristors in the abovesaid combinations thereof, such characteristics as depicted in FIG. 3B can be obtained by the gate control of the thyristors for the main output and the auxiliary output in the same manner as in the case of the six-phase, half-wave bridge.

Figure 7:
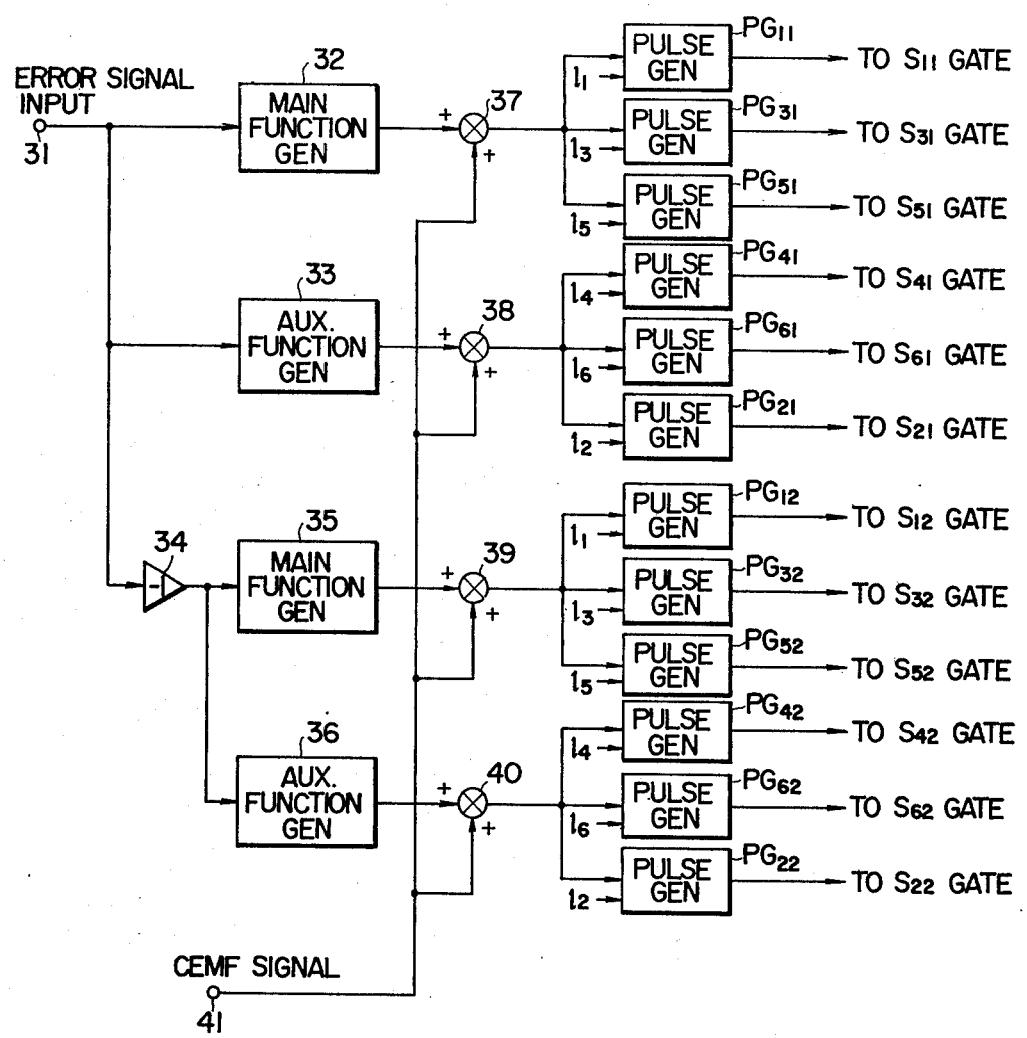
FIG. 7 is a block diagram illustrating an example of a gate phase shift control.

FIG. 7 illustrates an example of the gate phase shift control 19. In this example corresponding to FIG. 1, an input error signal, for example, in the DC servo type control device, is applied to a function generator 32 for the main output and a function generator 33 for the auxiliary output from a terminal 31. At the same time, the input error signal is also polarity inverted by an inverter 34 for input to another function generator 35 for the main output and another function generator 36 for the auxiliary output. The outputs from the function generators 32, 33, 35 and 36 are applied to adders 37, 38, 39 and 40, respectively, for addition with the counter electromotive force of the abovesaid DC motor from a terminal 41. The output from the adder 37 is supplied to pulse generators $PG_{11}$, $PG_{31}$ and $PG_{51}$. The output pulses from the pulse generators $PG_{11}$, $PG_{31}$ and $PG_{51}$ are respectively applied to the gates of those thyristors $S_{11}$, $S_{31}$ and $S_{51}$ of the main output bridge which supply the positive current to the motor. The output from the adder 38 is applied to pulse generators $PG_{41}$, $PG_{61}$ and $PG_{21}$, whose output pulses are respectively supplied to the gates of those thyristors $S_{41}$, $S_{61}$ and $S_{21}$ of the auxiliary output bridge which supply the positive current to the motor. The output from the adder 39 is fed to pulse generators $PG_{12}$, $PG_{32}$ and $PG_{52}$, the output pulses from which are respectively applied to the gates of those thyristors $S_{12}$, $S_{32}$ and $S_{52}$ of the main output bridge which supply the negative current to the motor. The output from the adder 40 is applied to pulse generators $PG_{42}$, $PG_{62}$ and $PG_{22}$, the output pulses from which are respectively fed to the gates of those thyristors $S_{42}$, $S_{62}$ and $S_{22}$ of the auxiliary bridge which supply the negative current to the motor.

Figure 8:
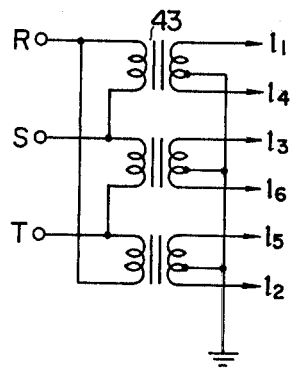
FIG. 8 is a connection diagram showing a power source transformer for the thyristor gates.

In order that the output pulses from the pulse generators $PG_{11}$ to $PG_{62}$ may be each applied in synchronism with the AC power fed to each thyristor, a power source transformer 43 for the thyristor gates is provided, as depicted in FIG. 8. The AC power fed to the primary side of the power source transformer 11 in FIG. 1A is branched to be applied to terminals R, S and T of the primary side of the transformer 43. From the terminals of the secondary side of the transformer 43 corresponding to the terminals $t_1$, $t_4$, $t_3$, $t_6$, $t_5$ and $t_2$, respectively, are obtained outputs $l_1$, $l_4$, $l_3$, $l_6$, $l_5$ and $l_2$. The outputs $l_1$, $l_3$ and $l_5$ are supplied to the pulse generators $PG_{11}$, $PG_{31}$, $PG_{51}$ and $PG_{12}$, $PG_{32}$, $PG_{52}$, respectively, and the outputs $l_4$, $l_6$ and $l_4$ to the pulse generator $PG_{41}$, $PG_{61}$, $PG_{21}$ and $PG_{42}$, $PG_{62}$, $PG_{22}$, respectively.

Figure 9:
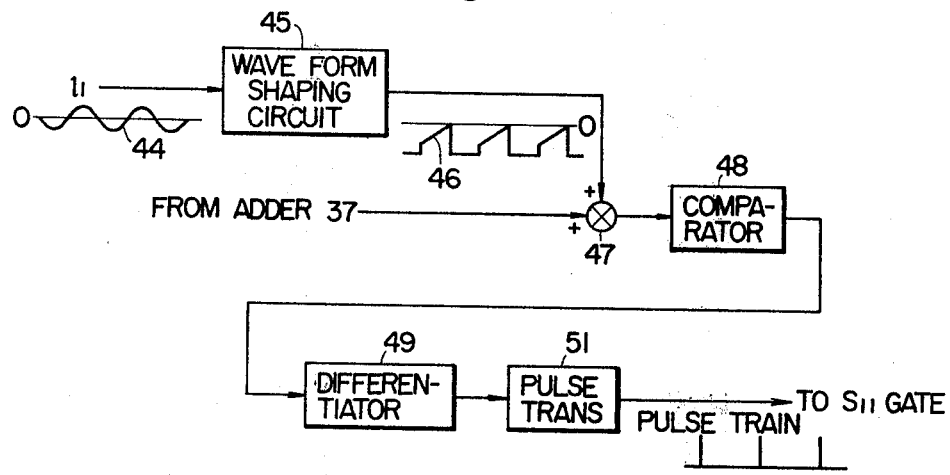
FIG. 9 is a block diagram illustrating an example of a pulse generator.

Since the pulse generators $PG_{11}$ to $PG_{62}$ are identical in construction with one another, the pulse generator $PG_{11}$ will be described with reference to FIG. 9. The output $l_1$ from the power source transformer 43 for the thyristor gates is such a sine wave as indicated by the curve 44 but is converted by a waveform shaping circuit 45 into a triangular wave such as indicated by the curve 46 which is lower than the zero level. The triangular wave thus obtained and the output from the adder 37 in FIG. 7 are added together by an adder 47 and the added output is compared by a comparator 48 with the zero level. The compared output is differentiated by a differentiator 49, the output from which is insulated by a pulse transformer 51 for isolation in terms of DC and applied to the gate of the thyristor $S_{11}$. The pulse applied to this gate occurs at the moment when the added input to the comparator 48 exceeds the zero level and the phase of the pulse shifts in dependence upon the magnitude of the added input.

Figure 10:
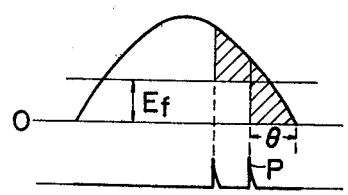
FIG. 10 is a graph showing the relation between a counter electromotive force and a flow angle.

When the counter electromotive force $E_f$ of the DC motor changes, if the thyristor gate pulses are of the same phase, the current flow angle $\theta$ varies, as depicted in FIG. 10. Accordingly, for obtaining the same current flow angle, it is necessary to change the phase of the gate pulse P. To this end, in FIG. 7, the counter electromotive force is supplied to the adders 37 to 40 from the terminal 41, thereby to prevent the generation of an error. In the case of a fixed-field DC motor, since the electromotive force is proportional to the revolving speed of the motor, it is obtained by converting into a voltage the frequency of pulses from a speed detector of a high response, for instance, an incremental encoder coupled with the motor.

Figure 11:
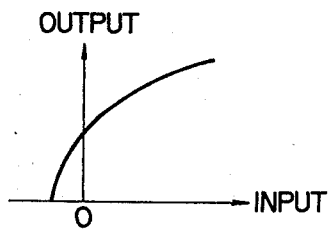
FIG. 11 is a graph showing an example of the input-output characteristic of a function generator for the main output.
Figure 12:
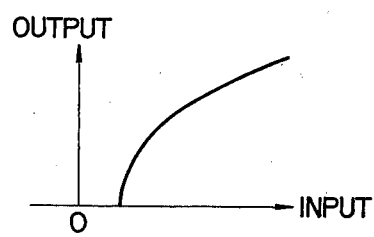
FIG. 12 is a graph showing an example of the input-output characteristic of a function generator for the auxiliary output.

By the way, the input-output characteristics of the function generators 32 and 35 for the main output are so selected as to provide outputs corresponding to the curve 21a in FIG. 3A even if the input is zero, as shown in FIG. 11. On the other hand, the input-output characteristics of the function generators 33 and 36 for the auxiliary output are so selected as not to provide any outputs corresponding to the curve 22a in FIG. 3B while the input is small, as depicted in FIG. 12. Consequently, in the range that the error input signal is small, only the thyristors $S_{11}$, $S_{31}$, $S_{51}$, $S_{12}$, $S_{32}$ and $S_{52}$ forming the main output bridge are controlled.

It will be apparent that many modifications and variations may be effected without departing from the scope of the novel concepts of this invention.

What is claimed is:

1. A thyristor control method for a thyristor AC-DC converter in which six pairs of opposite-polarity thyristors are respectively connected at one end to both ends of first, second and third secondary windings of a three-phase transformer and at the other end to one end of a load, the other end of the load being connected to the mid point of end of the first, second and third secondary windings, and in which the gates of the six pairs of thyristors are controlled by a control device to convert an AC power from the three-phase transformer into a DC power for input to the load, wherein, in a small current region in which the current to the load is small, the three pairs of thyristors connected to the corresponding ends of the first, second and third secondary windings are controlled to supply a current to the load by a three-phase, half-wave back-to-back connection bridge AC-DC converting operation of a main output bridge formed with the three pairs of thyristors but an auxiliary output bridge formed with the three pairs of thyristors connected to the other ends of the secondary windings is not controlled;

wherein, in a large current region in which the current to the load is large, the main and auxiliary output bridges are both similarly controlled to supply therefrom currents of substantially the same magnitude to the load, thereby to achieve an AC-DC converting operation of a balanced six-phase, half-wave back-to-back thyristor bridge as a whole; and wherein, in an intermediate current region in which the current to the load is intermediate between the small and large currents, the main and auxiliary output bridge are both actuated but the current from the former is made larger than that of the latter and the both currents are applied to the load, thereby to achieve an AC-DC converting operation of an unbalanced six-phase, half-wave back-to-back connection thyristor bridge as a whole.

2. A thyristor control method according to claim 1, wherein, in the small current region, the three thyristors of the same polarity relative to the secondary windings of the main output bridge and the three thyristors opposite in polarity to the three thyristors of the same polarity are alternately controlled to conduct one after another to supply positive and negative currents to the load alternatively with each other, the polarity and magnitude of an equivalent current to the load are determined by the mean values of the positive and negative currents, and the load current is made zero equivalently when the mean values of the positive and negative currents are equal in magnitude to each other.

3. A thyristor control method according to claim 2, wherein only the positive or negative current is supplied to the load in a narrow region of the small current region adjoining the intermediate current region.

4. A thyristor control method for a thyristor AC-DC converter in which a three-phase voltage is applied across terminals R, S and T, the terminal R being connected to the anodes of thyristors $S_{11}$ and $S_{22}$ and the cathodes of thyristors $S_{31}$ and $S_{42}$, the terminal S being connected to the anodes of thyristors $S_{31}$ and $S_{42}$ and the cathodes of thyristors $S_{32}$ and $S_{41}$ and the terminal T being connected to the anodes of thyristors $S_{51}$ and $S_{62}$ and the cathodes of thyristors $S_{52}$ and $S_{61}$, the other ends of the thyristors $S_{11}$, $S_{31}$, $S_{51}$, $S_{12}$, $S_{32}$ and $S_{52}$ being connected to one end of the load and the other ends of the thyristors $S_{21}$, $S_{41}$, $S_{61}$, $S_{22}$, $S_{42}$ and $S_{62}$ being connected to the other end of the load, and the gates of these thyristors are controlled by a control device to convert an AC power applied across the terminals R, S and T into a DC power for input to the load, wherein the outputs from the thyristors $S_{11}$ and $S_{41}$, $S_{31}$ and $S_{61}$, and $S_{51}$ and $S_{21}$ for supplying a positive current to the load are used as a main output, the outputs from the thyristors $S_{11}$ and $S_{61}$, $S_{31}$ and $S_{21}$, and $S_{51}$ and $S_{41}$ are used as an auxiliary output, the outputs from the thyristors $S_{42}$ and $S_{12}$, $S_{62}$ and $S_{32}$, and $S_{22}$ and $S_{52}$ for supplying a negative current to the load are used as a main output and the outputs from the thyristors $S_{42}$ and $S_{52}$, $S_{62}$ and $S_{12}$, and $S_{22}$ and $S_{32}$ are used as an auxiliary output;

wherein, in a small current region in which the current to the load is small, a three-phase, half-wave back-to-back connection bridge AC-DC converting operation using only the main outputs is achieved;

wherein, in a large current region in which the current to the load is large, the main and auxiliary outputs made to be of substantially the same magnitude are supplied to achieve a balanced three-phase, full-wave back-to-back connection bridge AC-DC converting operation; and wherein, in an intermediate current region in which the current to the load is intermediate between the large and small currents, the main and auxiliary outputs are supplied but the former is selected to be larger than the latter, thereby to achieve an unbalanced three-phase, full-wave back-to-back connection bridge AC-DC converting operation.

5. A thyristor control method according to claim 4, wherein, in the small current region, the positive and negative currents based on the main outputs, respectively, are alternately supplied to the load, the polarity and magnitude of an equivalent current to the load are determined by the mean values of the positive and negative currents, and the load current is made zero equivalently when the mean values of the positive and negative currents are equal in magnitude to each other.

6. A thyristor control method according to claim 5, wherein, in a narrow region of the small current region adjoining the intermediate current region, only the positive or negative main output is supplied to the load.

* * * * *